(12) United States Patent
Vilmos

(10) Patent No.: US 11,245,523 B2
(45) Date of Patent: Feb. 8, 2022

(54) METHOD FOR IMPLEMENTING CLIENT SIDE CREDENTIAL CONTROL TO AUTHORIZE ACCESS TO A PROTECTED DEVICE

(71) Applicant: SafePay Systems, Ltd., Budapest (HU)

(72) Inventor: András Vilmos, Budapest (HU)

(73) Assignee: András Vilmos, Budapest (HU)

( * ) Notice: Subject to any disclaimer, the term of this patent is extended or adjusted under 35 U.S.C. 154(b) by 0 days.

(21) Appl. No.: 15/931,313

(22) Filed: May 13, 2020

(65) Prior Publication Data

US 2020/0274866 A1 Aug. 27, 2020

Related U.S. Application Data

(63) Continuation-in-part of application No. PCT/HU2018/050048, filed on Nov. 20, 2018, and a continuation of application No. PCT/HU2019/050023, filed on May 14, 2019.

(30) Foreign Application Priority Data

Nov. 22, 2017 (HU) .................................... 1700484

(51) Int. Cl.
*H04L 9/32* (2006.01)
*H04L 29/06* (2006.01)
*H04L 9/08* (2006.01)

(52) U.S. Cl.
CPC .............. *H04L 9/32* (2013.01); *H04L 9/0825* (2013.01); *H04L 63/0407* (2013.01); *H04L 63/0428* (2013.01); *H04L 63/12* (2013.01)

(58) Field of Classification Search
None
See application file for complete search history.

(56) References Cited

U.S. PATENT DOCUMENTS

| | | | | |
|---|---|---|---|---|
| 2005/0036616 A1* | 2/2005 | Huang | ................... | H04L 9/0891 380/255 |
| 2006/0080257 A1* | 4/2006 | Vaughan | ................ | G06Q 10/10 705/51 |
| 2007/0250411 A1* | 10/2007 | Williams | ............. | G06Q 10/087 705/28 |
| 2007/0265094 A1* | 11/2007 | Tone | ........................ | G07F 17/32 463/42 |
| 2010/0197383 A1* | 8/2010 | Rader | ..................... | G06Q 20/34 463/25 |
| 2010/0308110 A1* | 12/2010 | Maddocks | ............ | G07F 7/1025 235/382.5 |
| 2013/0297933 A1* | 11/2013 | Fiducia | ............... | H04L 63/0823 713/156 |
| 2016/0364723 A1* | 12/2016 | Reese | ................ | G06Q 20/4012 |

* cited by examiner

*Primary Examiner* — Benjamin E Lanier
(74) *Attorney, Agent, or Firm* — Crowell & Moring LLP

(57) ABSTRACT

The invention relates to client-side credential control to allow remote access to a second device by a first device, including: storing a private key of a key pair in a secure storage device of a first device, generating data related to a command executable by the second device, checking in the secure storage device, whether the data corresponds to at least one user credential related to the command executable by the second device stored in the secure storage device, signing a data block derived from the data using the private key, and transmitting a data packet generated from the data block to a gateway of the second device.

21 Claims, 13 Drawing Sheets

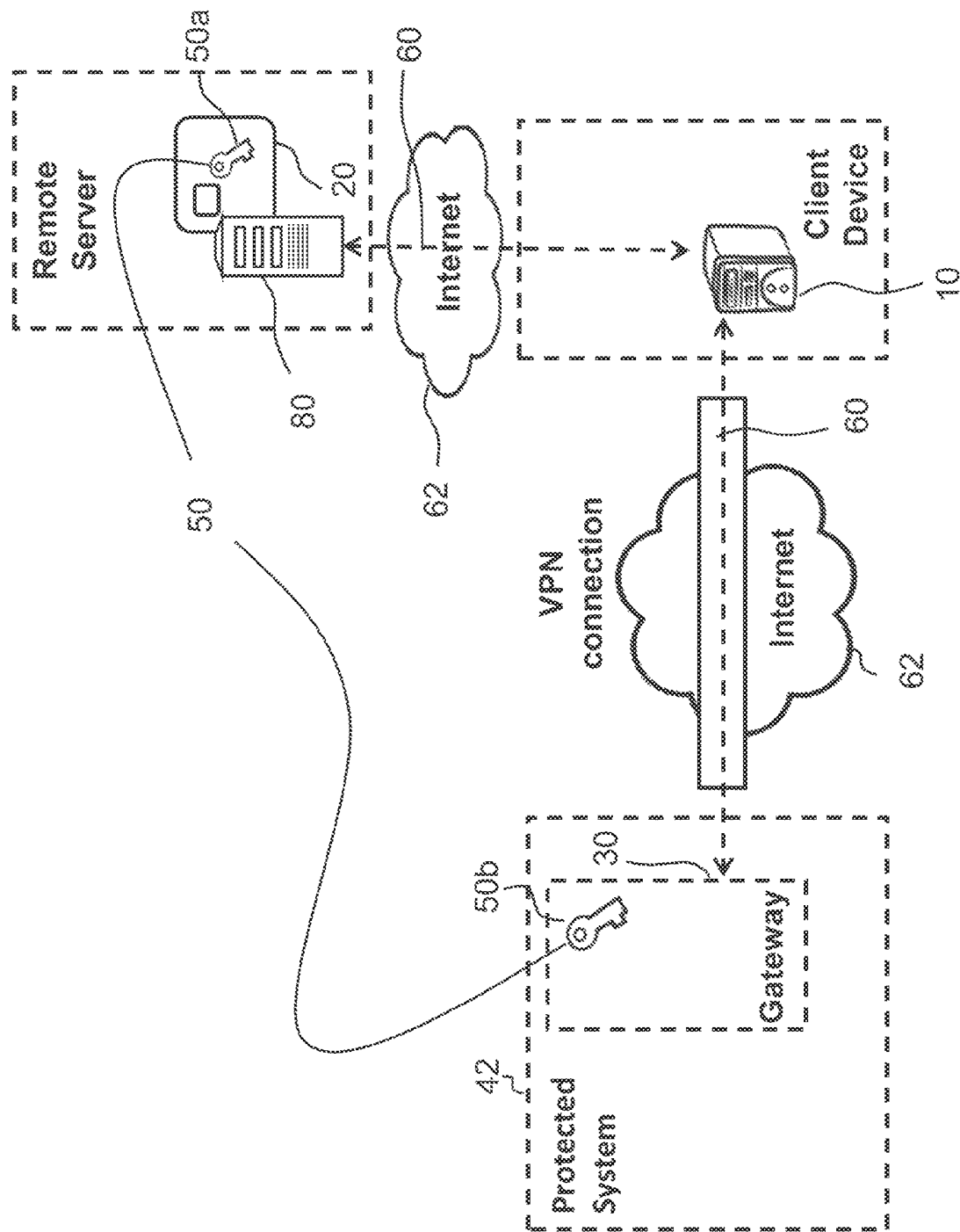

METHOD FOR IMPLEMENTING CLIENT SIDE CREDENTIAL CONTROL TO AUTHORIZE ACCESS TO A PROTECTED DEVICE

CROSS-REFERENCE TO RELATED APPLICATIONS

This application is a continuation-in-part of International Application No. PCT/HU2018/050048, filed on Nov. 20, 2018, and published as WO 2019/102239 A1 on May 31, 2019, titled "METHOD FOR ENSURING SECURE AND AUTHORIZED COMMUNICATIONS BETWEEN A FIRST DEVICE AND A SECOND DEVICE," which claims priority from Hungarian Application No. P1700484, filed on Nov. 22, 2017, the entirety of which is each hereby fully incorporated by reference herein. This application is also a continuation of International Application No. PCT/HU2019/050023, filed on May 14, 2019, titled "METHOD FOR IMPLEMENTING CLIENT SIDE CREDENTIAL CONTROL TO AUTHORIZE ACCESS TO A PROTECTED DEVICE," the entirety of which is hereby fully incorporated by reference herein.

The present invention relates to a method for checking user credential with a client (first) device used by the user and a secure storage device connected therewith.

Today with the ubiquity of the internet we have access remotely to a range of systems, in our offices and homes. Unless these are highly sophisticated solutions with professional management the level of associated security is quite low, sometimes even nonexistent. This is a serious situation which has been industry wide identified, but not successfully addressed yet. The problems, the vulnerability and the potential losses and threats will exponentially grow with the proliferation of IoT (Internet of Things) which introduces the internet and remote communication to all aspects of our life. In the future security systems will not only have to protect financial resources, data and information but frequently human life as well.

Although the risks have been identified, the adequate solutions are either missing, are too expensive or deteriorate the core functionality, usability, therefore many systems are presently sold and implemented without adequate protection. Such practices already today may lead to large scale attacks (Like the Mirai botnet orchestrating a large scale DDoS attack building on the lack of protection in thousands of IP cameras and taking down much of America's internet infrastructure.) which only provided some light demonstration what may happen to us in the future if we do not treat the security challenge more seriously.

Even some novel services like smart homes or remote health monitoring, use some type of user name and password or biometric based protection. Such solutions are disclosed in US 2014/0218517, in which the user may reach or manage smart devices (e.g. webcam, robot vacuum cleaner) through a gateway. It is important to note that from the perspective of its main functionality the "gateway" used there is not a security device, but rather a centrepoint (HUB) connecting the home devices as it can be seen from FIG. 5 and the description. Also US 2014/0218517 only mentions the management of access rights. (see paragraph 81 and 86) As a specific example it refers to the identification of the mobile terminal of the remote user or a simple login authentication (loginID and password)

The study of ETSI Technical Committee Intelligent Transport System (ETSI TS 102 731 V1.1.1 "Intelligent Transport System (ITS); Security; Security Services and Architecture", Technical specification, 2010 September) deals with the secure communication of transport systems. The study mentions in tables 1 and 2 the potential use of asymmetric keys, but not in relation with gateways.

US 2017/0222991 introduces the user profile management of wireless systems. The disclosed solution uses asymmetric keys to identify the sender party, but there is no gateway device shown, or any related functionality.

US 2018/0062858 A1 also describes a solution which uses asymmetric key cryptography, but the purpose of the here disclosed method, based on PKI encryption, is the identification of the user and the control of the authenticity of the command given, and the authorization is performed on the server side. The authorization token referred to in the application is generated by the server. To the contrary of this, the inventor of the present invention recognized, that it is more favorable if the signed data block (containing the permission) is the result of the positive outcome of the control to be generated by the secure storage device connected to the client device.

It has been demonstrated upon several occasions that most traditional security measures can be hacked. The applied solutions may have been satisfactory when a room could be monitored by a camera remotely, but when the same camera can also be turned off and the door opened using a mobile app. the level of necessary security measures need to be dramatically increased.

Thus there is a need for increasing the security level of remote operations.

The present invention has for objective to overcome the problems associated with the prior art solutions and to assure the protection of a remotely operable second device (which may even be a complex system as well) without the need to carry out major modifications on the device itself. Under the concept of the present invention the remotely operable second (protected) device has the broadest meaning as it may be access to a mail server, or even granting permission to use bank card data stored on a server.

The present invention is based on the recognition that the planned objective can be economically efficiently reached by delegating the credential control to the client side, and by performing validity and integrity verification of the signed data block resulting as the positive outcome of the control on the server side.

The solution disclosed in the invention is similar in logic to the approach of the new FIDO, user authentication standard, as FIDO also uses asymmetric key encryption, also places the sensitive identifier—the user's private key—, which needs protection, to the client side instead of server side storage. However while in case of FIDO signature is used on the challenge sent by the server to the user, and based on the signature the user is authenticated on the server side, according to the method of the present invention we are far advancing this level, as we are not signing a challenge referring to a single session, but we are signing the data itself, which is derived from the command executable by the second (protected) device, and even that only after we have checked the credential related to the command in the secure storage connected to the client device. It is also a difference that while in case of FIDO the purpose of the server side control is the authentication of the user and credential control takes place only thereafter, in case of the present invention credential control is already performed on the client side, and the signed data related to the command is only reaching the server if the user really had valid credential, thus filtering all unwanted communication and disencumbering the server side.

The method requires a secure storage device, connected to the first (client) device, where the credential (privilege data) control takes place. On the server side a new device, a secure gateway is installed into the communication channel established between the first (client) and second (protected) devices. As an alternative the gateway functions can be implemented in the protected system itself, but in this case more substantial modifications are necessary on the access point of the protected system. Together the new method and the new devices provide the highest level of user and privileges authentication and authorization. With the proposed solution even existing implementations can be upgraded to the highest security level with marginal expenses, without the need to modify the protected system. This way all that is needed is to install a gateway into the communication channel between the client and the protected device, add some additional functions into the front-end management application running on the first device and connect a secure storage device to it.

These objectives are achieved by a Method for implementing client-side credential control and secure and authorized communications between a first device and a second device, the method comprising:

providing a gateway integrated into the second (protected) device, or independent thereof capable for communication using electronic data channel with the first (client) device, providing a secure storage device to first (client) device, providing user privileges to at least one command executable by the second (protected) device and storing the user credentials (privilege data) in the secure storage device;

providing a key pair of asymmetric cryptography having a private key and a public key, storing the private key of the key pair used for the asymmetric encryption in the secure storage device, generating at least one data related to the command executable by the second (protected) device, checking in the secure storage device, whether the data related to the command executable by the second (protected) device corresponds to at least one user credential related to the command executable by the second (protected) device, stored in the secure storage device, in case of correspondence generating in the secure storage device a data block derived from the data related to the command executable by the second (protected) device, signing the data block with the support of the secure storage device using the private key stored in the secure storage device, generating at least one data packet from the data block signed with the private key transmitting the at least one data packet to the gateway via the electronic communication channel.

In the context of the present invention the term "generating at least one data packet from the data block signed with the private key" which is transmitted to the gateway is understood to have the meaning that the at least one data packet contains the signed data block itself but in this one or in another data packet the command executable by the second (protected) device may be transmitted as well. In case more data packets are received by the gateway, the data packets are preferably linked to each other.

In the context of the present invention the gateway may be an independent device, may be a module having the expected functionality and built into the second (protected) device, but the functions expected from the gateway may also be directly integrated into the second (protected) device. In this description all these forms of expression are commonly referred to as gateways Preferably, the first secure storage device is an embedded secure element in the first device, or a removable card (e.g. SIM card, SD card) of the first device, or an external smart card connectable to the first device, or a software application (e.g. Trusted Execution Environment) of the first device, or a secure storage facility in a cloud on a remote server, or similar.

The data block derived from the data related to the command preferably contains the command executable by the second (protected) device extended with some additional information used by the gateway.

Alternatively the data block derived from the data related to the command preferably comprises a command code associated with the command.

Alternatively, or in addition, the data block derived from the data related to the command preferably comprises a data imprint (hash) of the command, which hash is generated by the first device or the secure storage device itself using a hash algorithm.

In each of the above-described data block generation cases, it may happen that in order to further enhance security, in the secure storage additional transformations are performed on the controlled data related to the command before generating the data block, and then the data block is generated using this and not the data related to the command. This is also indicated by the term data block derived from the data related to the command, that is, the data block does not necessarily contain the data related to the command, but instead it may contain other data from which the data related to the command and/or the command can be identified on the receiving side. For example, the data related to the command received by the secure storage may be a first type of command identifier code, on the basis of which the secure element can identify the associated command, but in the data block a second type of command identifier code is placed, on the basis of which the gateway can identify the same command.

Based on the above, the gateway may also receive the command executable by the second (protected) device as part of the signed data block in the same or in another data packet.

Based on common technical practice, the client device is a computer, or a mobile device having a secure storage connected to it, that is remotely connected to the protected (second) device, and generation of data related to the command executable by the second (protected) device—meaning the calling of a function—is performed by using the client device.

However, according to the state of the art, there is no obstacle to even generate the data related to the command executable by the second (protected) device in the secure storage, and only to use the client device for user data input and communication with the protected system. Such a technical solution is supported by either the use of SIM toolkit or the use of Smart Card Web Server.

The invention further relates to a gateway comprising a processor, a data storage and a communication unit and configured to perform the method according to the invention.

The invention also relates to a secure storage device configured to perform the method of the invention.

The invention also relates to a computer program which computer program if run on a gateway, causes the gateway to perform the process according to the invention.

The invention further relates to a non-volatile storage medium in which a computer program containing commands is stored which when executed by at least one processor of a gateway causes the gateway to execute the method according to the invention.

Further advantageous embodiments are defined in the appended dependent claims.

Further details of the invention will be apparent from the accompanying figures and exemplary embodiments.

FIG. 1c is a schematic block diagram of an exemplary embodiment of a system using the gateway as part of protected system.

FIG. 2a is a more detailed block diagram of certain element of FIG. 1a.

Figure 1A:
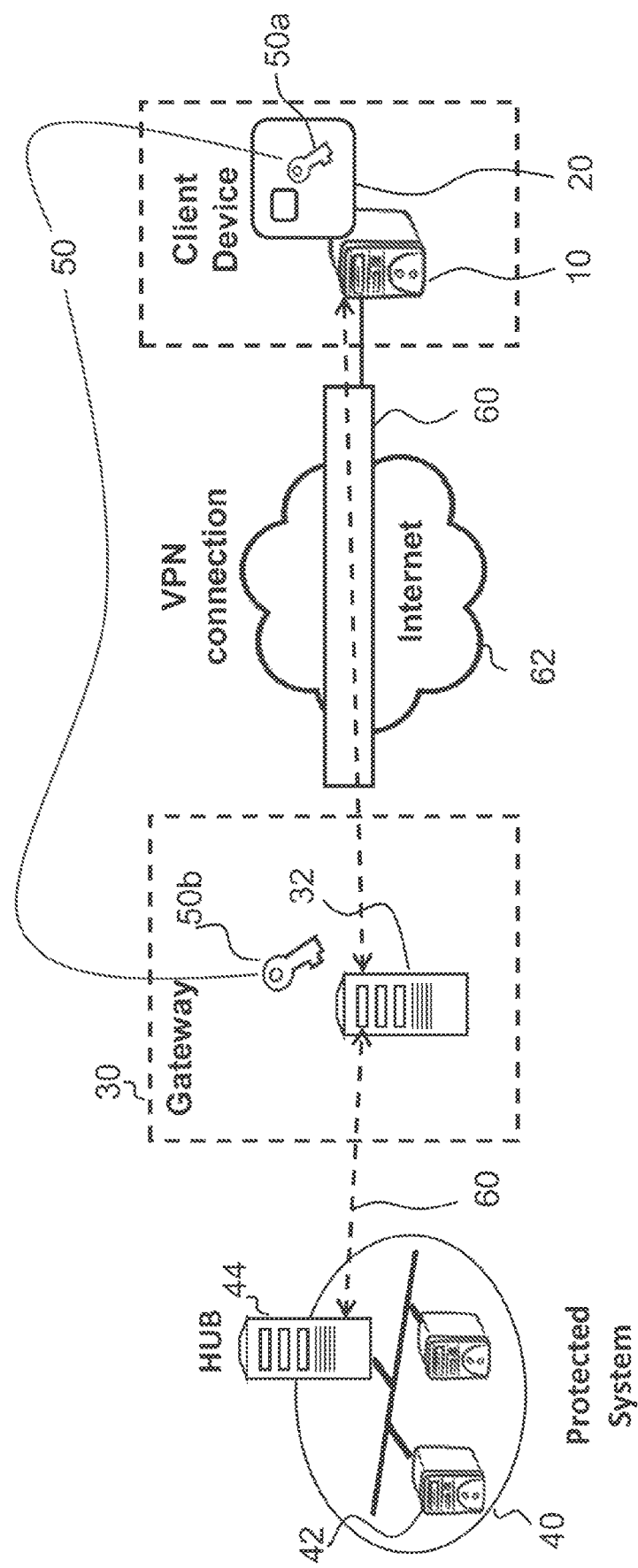
FIG. 1a is a schematic block diagram of an exemplary embodiment of a system suitable for carrying out the method according to the invention.
Figure 6A:
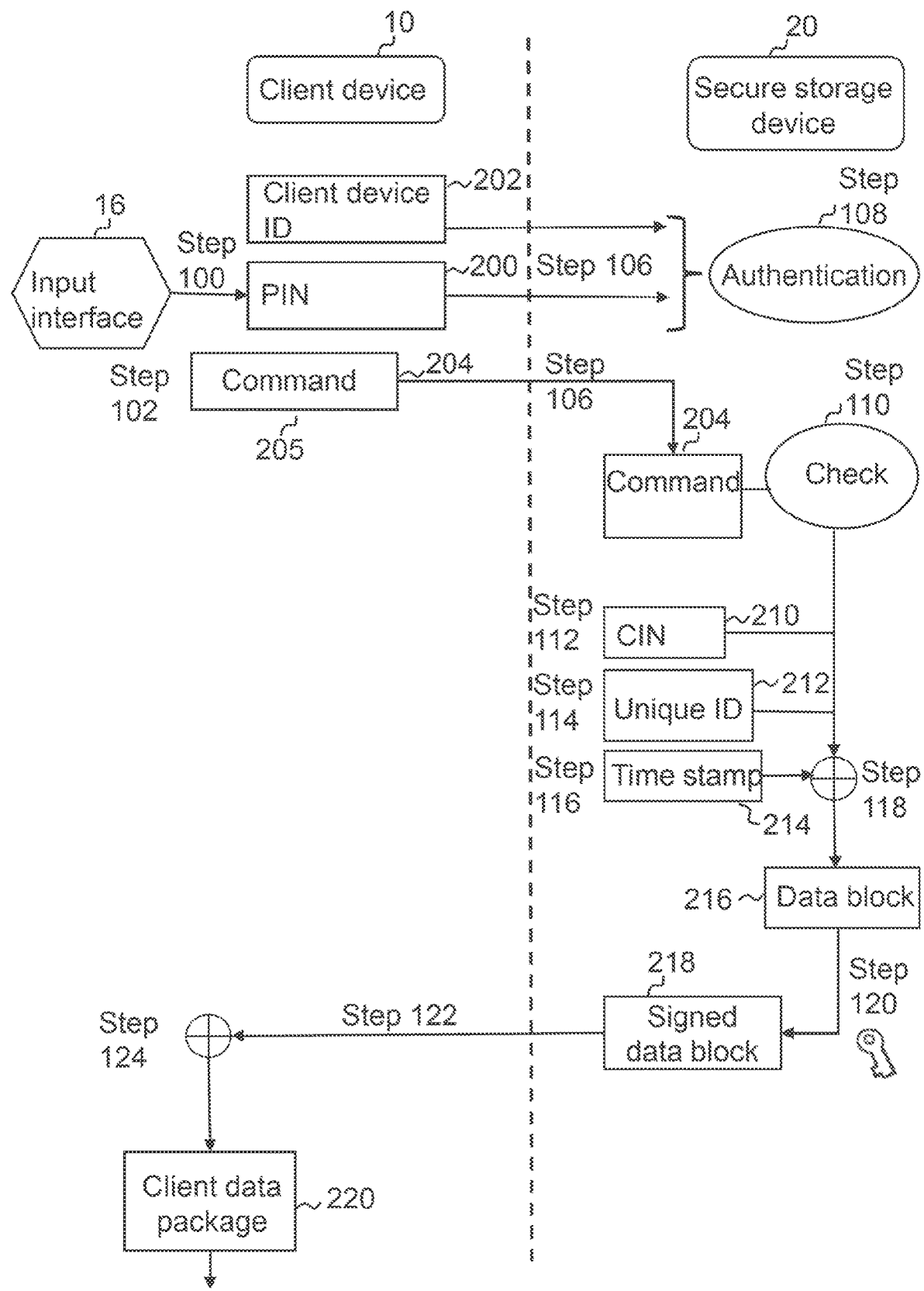
Figure 6B:
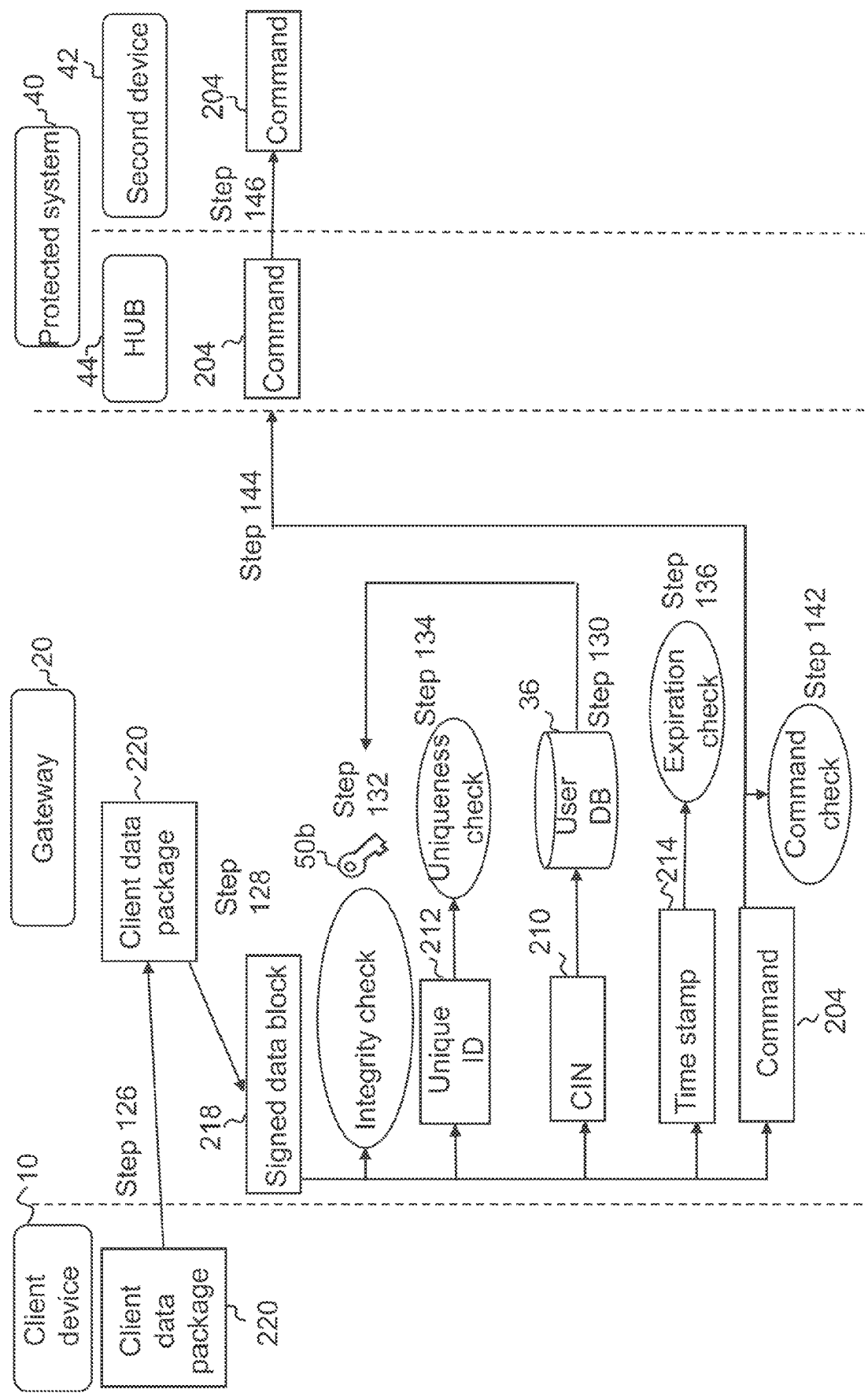

FIGS. 6a and 6b are flow diagrams illustrating the steps of a further exemplary embodiment of the present invention The exemplary embodiment illustrated in FIG. 1a comprises a first client device 10 equipped with a secure storage 20, which in this implementation is directly connected to it, a gateway 30, a protected system 40 including at least one remotely controllable second (protected) device 42 and an asymmetric cryptography key pair 50 consisting of a private key 50a and a public key 50b. The asymmetric cryptography infrastructure may be based on any kind of cryptographic algorithms, including post-quantum cryptographic algorithms as well. The client device 10 and the gateway 30 are connectable via an electronic communication channel 60, which is preferably established over the Internet 62. The embodiment shown in FIG. 1b differs from FIG. 1a in that the secure storage 20 is directly connected to a remote computer, preferably a computer 80, so that it can be connected to the client device 10 via an additional electronic communication channel 60, preferably via the Internet 62.

Figure 1B:
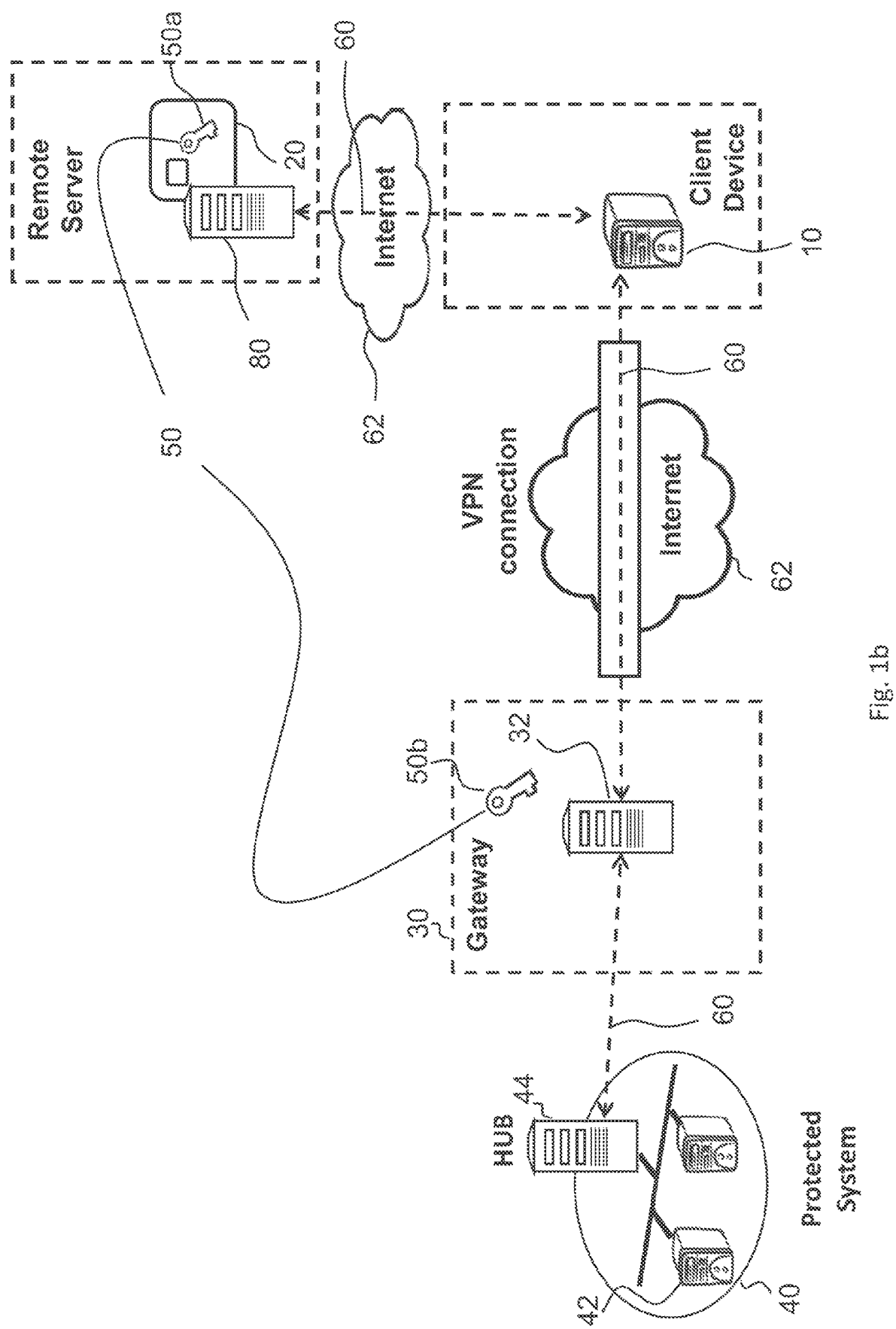
FIG. 1b is a schematic block diagram of an exemplary embodiment of a system using a secure storage device connected to a remote server.
Figure 2A:
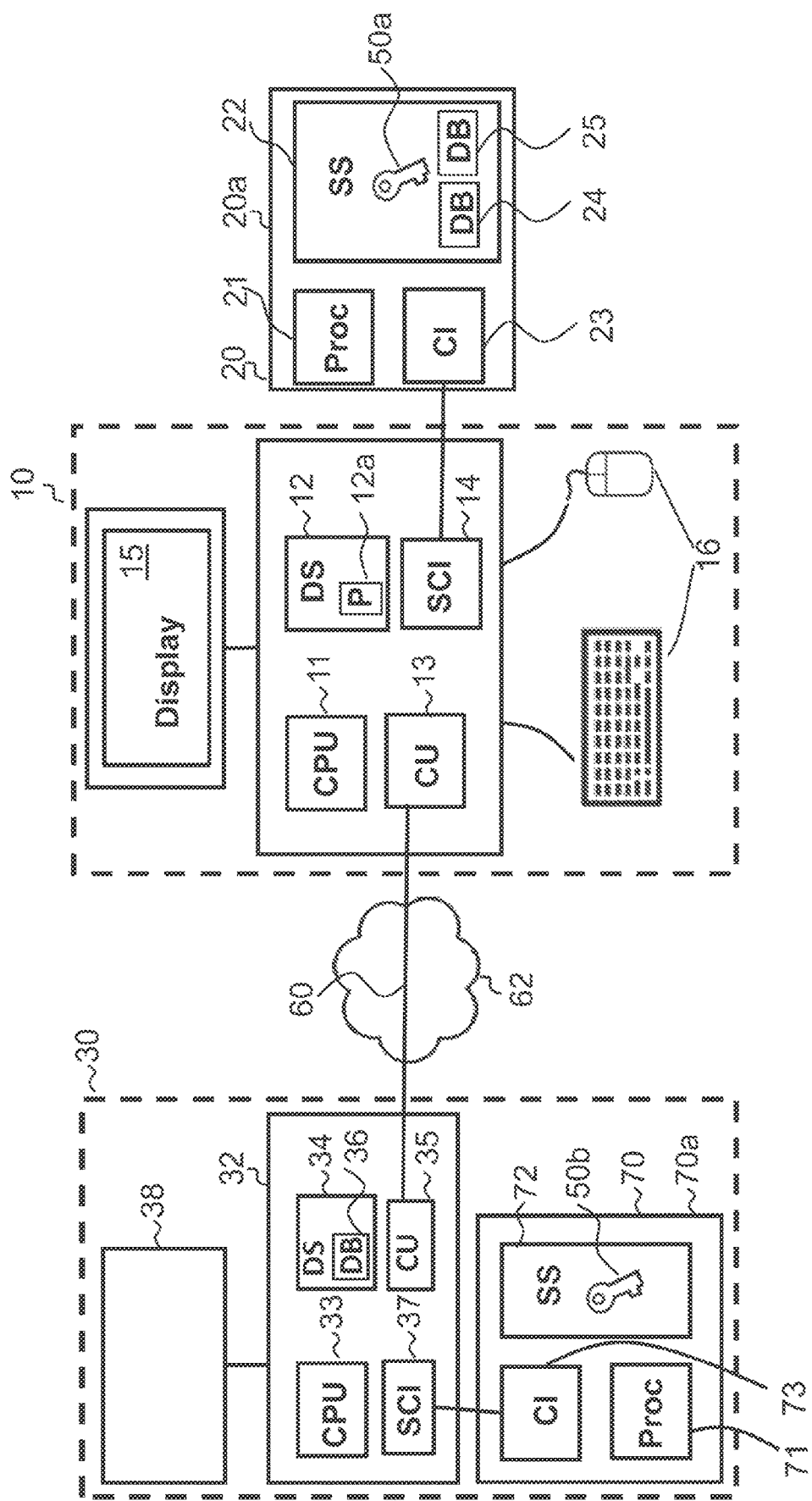
Figure 2B:
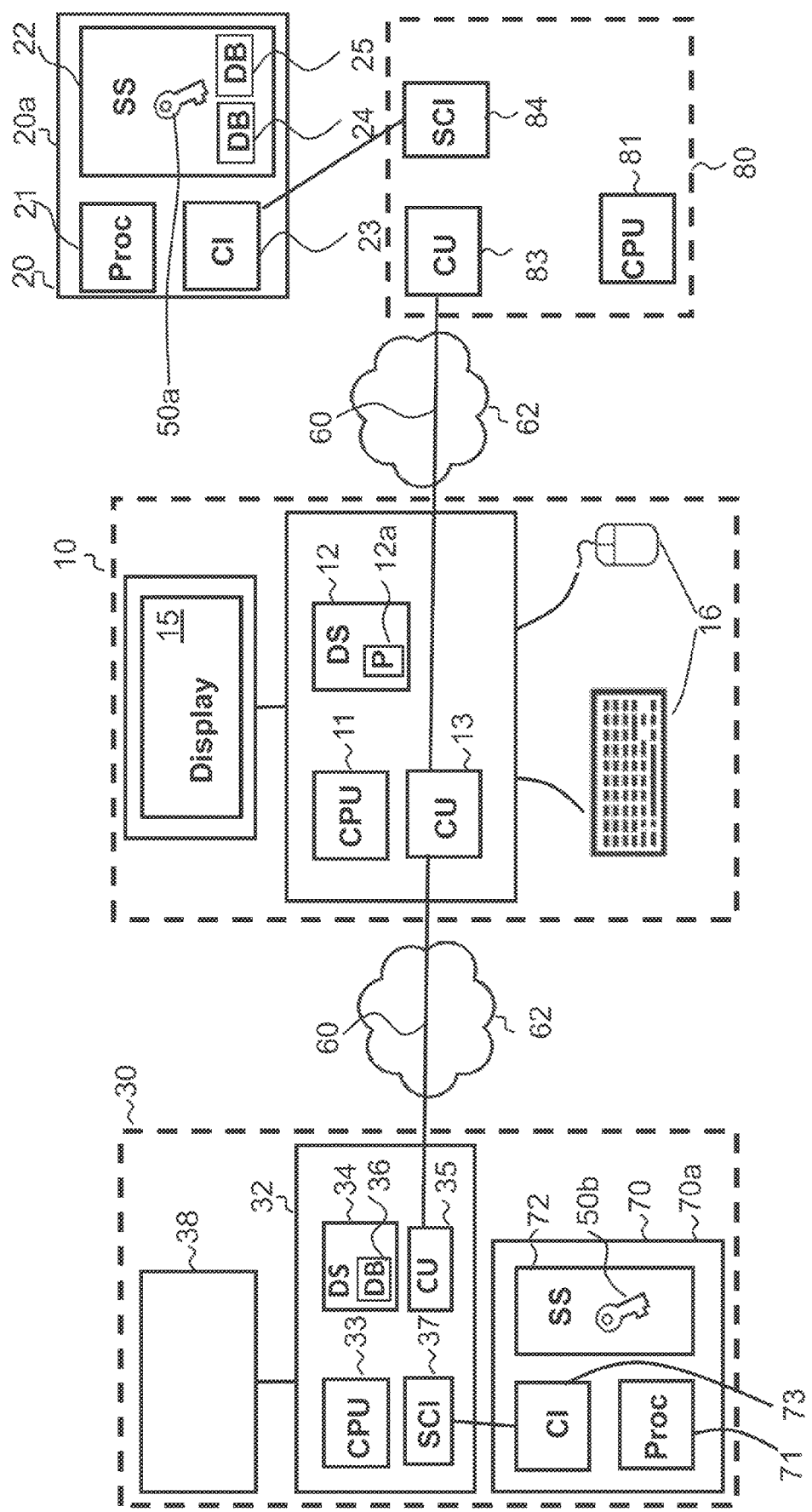
FIG. 2b is a more detailed block diagram of certain element of FIG. 1b.

According to the embodiments shown on FIG. 1a and FIG. 1b the client device 10 is a personal computer having a processor 11, a data storage 12, a communication unit 13, a secure storage interface 14, a display 15 and a user input interface 16 e.g. keyboard, touchscreen, mouse, etc. as shown on FIG. 2a and FIG. 2b. Depending on the type and placement of the secure storage 20, the client device 10 has a secure storage interface 14 (FIG. 2a), or, if the secure storage 20 is placed on a remote computer, preferably a remote server 80, this interface is located on the remote machine. Other type client devices than personal computers could be used as well, such as a smart phone, tablet, laptop, smart watch, etc. These devices have similar structure, accordingly the present description applies mutatis mutandis.

Preferably, a program 12a for generating and sending operation commands to the remotely controllable second (protected) device 42 is stored in the data storage 12 of the client device (computer) 10.

According to the present embodiments the secure storage device 20 is a smart card 20a, which as shown on FIG. 2a and FIG. 2b also comprises a processor 21, a storage unit 22 and a communication interface 23 (such as a Global Platform standard JAVA card). The client device 10 communicates with the smart card 20 over the smart card interface 14. (FIG. 2a) The communication between the client device 10 and secure storage device 20 in case the smart card 20a is placed on a remote computer (server 80) is performed by using the communication interface 13 of the client device 10 over the Internet-based 62 electronic communication channel 60 between the client device 10 and the remote server 80 and the remote server 80 has the smart card interface 84. (FIG. 2b). In FIG. 2b, only the elements of relevance to the present process, i.e. processor 81, communication interface 83, and smart card interface 84 are shown.

The private key 50a is stored in the secure storage unit 22. Preferably, user authentication data 24 and user privileges data 25 are also stored in the secure storage unit 22. Other types of secure storage devices 20 are also conceivable as will be apparent for a skilled person, for example an embedded secure element in the client device 10, a removable card (e.g. SIM card, SD card) of the client device 10, an external smart card connectable to the client device 10, a software application (e.g. Trusted Execution Environment) of the client device 10, or a secure storage facility in a cloud on a remote server.

According to the present embodiment the gateway 30 comprises a mini gateway computer 32, which is a small computer having at least a processor 33, a data storage 34 and a communication unit 35. The communication unit 13 of the client device 10 and the communication unit 35 of the gateway 30 are connectable via the electronic communication channel 60. Preferably the computer 32 is suitable for establishing the electronic communication channel 60 with the client device 10 over the Internet 62 in the form of a VPN connection (Virtual Private Network connection). Preferably a user database 36 is provided and stored in the data storage 34 of the gateway computer 32. Alternatively, the user database 36 may be stored at a remote location, which is accessible by the gateway 30, in particular by the gateway computer 32.

The gateway does not necessarily have a secure storage device 70 but in the present embodiment is equipped with the secure storage device 70, which is preferably a smart card 70a connected to a smart card interface 37 of the gateway computer 32. In the present case the secure storage device 70 comprises a processor 71, a secure storage 72 and a communication interface 73 for communicating with the gateway computer 32 via the smart card interface 37. The secure storage device 70 of the gateway 30 may have various form factors or types, including, but not limited to SIM card, smart card, HSM module, SD card, embedded secure element, trusted execution environment, external plastic card as well as remotely connected secure storage facility.

The public key 50b of the asymmetric cryptography key pair 50 is preferably stored in the secure storage unit 72 of the secure storage device 70 as illustrated in FIG. 2a and FIG. 2b, however, it may also be stored in the data storage 34 of the gateway computer 32 without any substantial security risk. Public keys are stored in the secure storage if it needs to be assured that only keys belonging to the system may be used and we want to make the addition of new keys more difficult. It should also be noted that for specific configurations (e.g. when X.509 public key certificates are used) the public key 50b should not necessarily be stored at all in the gateway 30 for the system to operate properly as it could also be received from the remote client device 10, during the communication.

In certain cases the user database 36 may also be stored in the secure storage unit 72 of the secure storage device 70 instead of the data storage 34 of the gateway computer 32.

The gateway 30 as usual may further comprise a firewall 38 (not shown on the figure), which can be configured according to the privileges of the users of the system, and or according to the specifics of the protected system 40. Furthermore it may be configured to block any communication not corresponding to specific parameters.

According to the present embodiments the protected system 40 comprises a HUB 44 connecting two or more remotely controllable (protected) devices 42 with the HUB 44. The HUB is also connected to the gateway 30 such that all external communication has to pass through the gateway 30.

FIGS. 1b, 2b show the particular embodiment in which the secure storage device 20 is not directly connected to the client device 10 but is connected to a remote computer, preferably a server 80, which communicates with the client device 10 using the Internet 62 via the electronic communication channel 60. The client device 10 accesses the secure storage device 20 (which may be a HSM module, a smart card 20a, or other type secure storage) through the remote server 80, during which the remote server 80 may be a simple proxy, but may also play an active role in message exchange. The server 80 receives the client device message 10 at the communication interface 83 suitable for remote communication, and then transfers it to the secure storage device 20 via the smart card interface 84.

The embodiment shown in FIG. 1c differs from the embodiment shown in FIG. 1b in that the gateway 30 is part of the protected device 42, which may also mean hardware and software components.

The method according to the present invention is performed with the system schematically depicted in FIGS. 1a, 1b and 1c as follows.

The user is assigned the smart card 20a, which is registered in the user database 36 of the gateway 30. The asymmetric cryptography key pair 50 is preferably generated in the smart card 20a and the private key 50a is stored in the secure storage 22 of the smart card 20a, while the public key 50b may be transmitted to the gateway 30, where it can be stored in the secure storage 72 of the second smart card 70a. In most cases it is unnecessary to store the 50b public key on a smart card, the public key 50b can be stored without security risk in the data storage 34 of the 32 gateway computer.

User privileges are also assigned to the user and registered in the user database 36 in the data storage 34 of the gateway 30. Preferably some or all user privileges data 25 are transmitted to the smart card 20a as well, and stored in the secure storage 22 thereof.

Figure 3A:
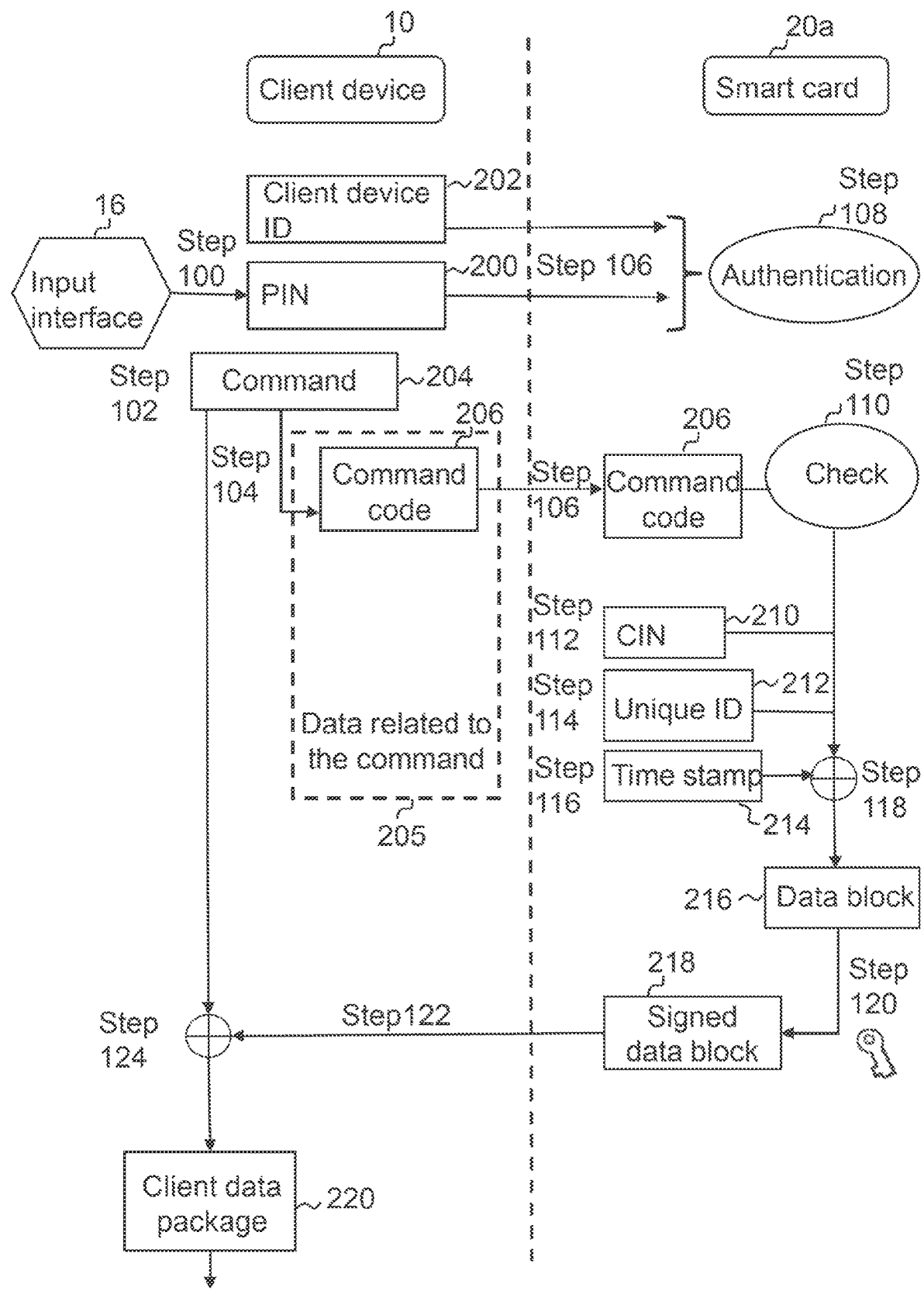
FIGS. 3a and 3b are flow diagrams illustrating the steps of an exemplary embodiment of the present invention.
Figure 3B:
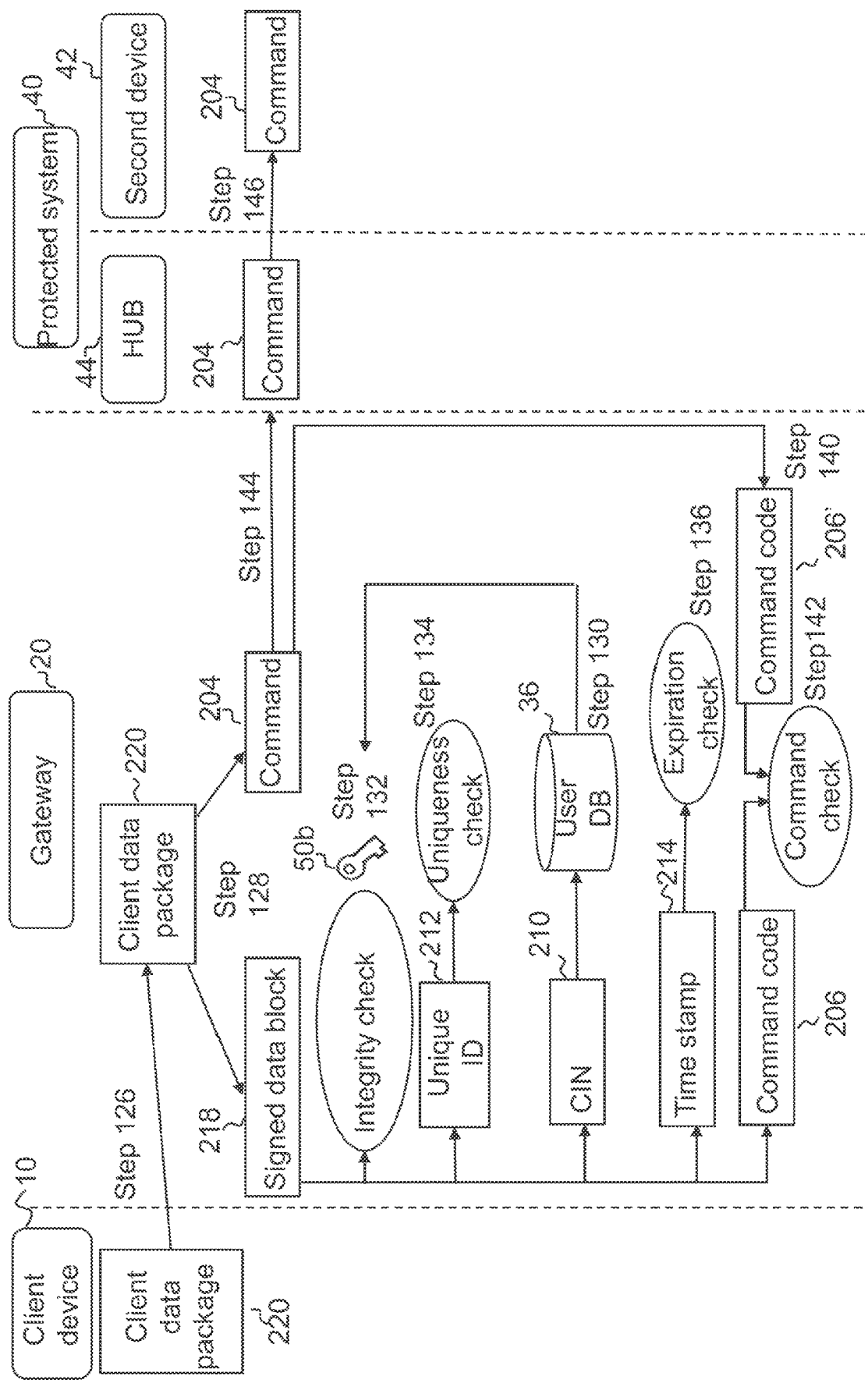

After the system has been set up an exemplary method according to the invention is carried out as illustrated in FIGS. 3a and 3b. It will be appreciated that the order of the steps may differ from the order presented here.

According to the present example, in step 100 the user authenticates himself by inputting via the input interface 16 of the client device 10 user authentication data. The user is authenticated by the smart card 20a connected with the client device 10. Preferably, the smart card has a unique PIN 200 which the user needs to know and needs to input upon request to be able to perform any transaction with it. Other type of user authentication data may be used as well, such as biometric identifiers. If the client device 10 is such a device which is typically used by a single user (e.g. a mobile phone), additionally a client device identifier 202 of the client device 10 (e.g. telephone number or serial number of the mobile phone, IMEI, or MAC address) may also be used to link the user to the smart card 20a, which increases the level of security.

In step 102 a command 204 is generated for the remotely controllable second (protected) device 42 with the program 12a stored in the data storage 12 of the client device 10. In step 104 the program 12a generates data related to the command 205 executable by the second (protected) device 42 from the command 204. In the present example the data 205 is a command code 206.

The command code 206 is a short code derived from the command 204 and serving to identify the command 204. For example in case the second device 42 is a remotely controllable lamp, the command for switching the light on may have a command code 206 such as "LON" and the command for switching the light off may have a command code 206 such as "LOFF".

In step 106 the user authentication data (unique PIN 200 and client device identifier 202) and the data 205 are transmitted to the smart card 20a that is connected to the user device 10 via the smart card interface 14 of the client device 10. The user authentication data and the data 205 may be transmitted in separate steps as well.

In step 108 the smart card 20a compares the received user authentication data with the user authentication data 24 stored in the secure storage 22 of the smart card 20a. Depending on the procedure applied, the comparison may be performed either using the original identifiers, or a hash generated thereof, or using other methods. If the user is successfully authenticated, the process continues, otherwise an error response or the like may be sent back to the client device 10.

In step 110 the smart card 20a checks the command code 206 by looking up the user privileges data 25 stored in the secure storage 22 in order to determine whether or not the authenticated user has the necessary privileges to use the command 204 which is defined by the command code 206. If the authenticated user is allowed to transmit the command 204, which is defined by the command code 206, to the protected system 40 then the control step is successful and the process continues, otherwise an error response or the like may be sent back to the client device 10.

In step 112 the smart card 20a retrieves its CIN (card identification number) 210, in step 114 the smart card 20a generates a unique identifier 212 for the specific transaction, and in step 116 the smart card 20a generates a timestamp 214 too. In step 118 the data 205, (which is now the command code 206), the CIN 210, the unique identifier 212 and the timestamp 214 are all concatenated in order to create a data block 216, which is then signed in step 120 by the smart card 20a using the private key 50a stored in its secure storage 22, whereby a signed data block 218 is generated. The steps of generating the additional data and the step of concatenating the various data may follow any order or be carried out in more steps sequentially, as is clear for a person skilled in the art. Also not all the steps of 112, 114, 116 need to be carried out for all implementations. In step 122 the signed data block 218 is transmitted back to the client device 10 via the communication interface 23 of the smart card 20a.

In step 124 the client device generates a client data packet 220 containing the original command 204 and the signed data block 218.

In step 126 the communication unit 13 of the client device 10 transmits the client data packet 220 to the gateway 30 through the electronic communication channel 60 established over the Internet 62, which is preferably a VPN connection. It is also possible to send the original command 204 and the signed data block 218 in separate data packets, which are linked to each other e.g. by message identifiers.

The steps 104, 106, 124 and 126 may be performed by the program 12a itself, generating and sending data 205 related to the command to the remotely controllable second device 42, stored in the data storage 12 of the client device 10, or may even be carried out by a second application dedicated for these functions and also forming a bridge between the program 12a and the secure storage device 20.

In step 128 the client data packet is received by the gateway 30. In case of multiple data packets the gateway 30 checks whether the multiple data packets are linked to each other.

In step 130 the gateway 30 obtains user identification data from the user database 36 based on the signed data block 218 for identifying the public key 50b of the asymmetric key cryptography key pair 50 of which the private key 50a has been used for signing the data block 216. In the present example the user identification data is the CIN 210 contained in the signed data block 218 as well as in the header of the message (implementing 2 factor authentication on the gateway side as well), since the smart card 20a is assigned to the user. The signature created by the unique private key 50a on the data block 216 may also serve as the user identification data, when used with a PKI certificate.

A public key certificate may even be stored in the client device 10 and thus may be sent together with the signed data block 218 to the gateway 30.

In step 132 the gateway verifies the integrity of the signed data block 218 by checking the signature of the signed data block 218 using the public key 50b. If the check fails it means that the data block has either been manipulated, or the client is not the one who it claims to be.

If the signed data block 218 is valid and intact, uniqueness and expiration of the data block is verified in steps 134 and 136. In step 134 uniqueness of the command 204 is verified based on the unique identifier 212 contained in the signed data block 218: the gateway 30 checks whether or not the unique identifier 212 has already been previously used, if yes the command 204 will not be forwarded to the second (protected) device 42 of the protected system 40. In step 136 expiration is verified based on the timestamp 214, current time and a pre-set expiry value, e.g. 1 minutes. The gateway 30 checks whether or not the pre-set expiry value had already expired since the timestamp 214 was applied, if yes the command 204 will not be forwarded to the second (protected) device 42.

In step 142 the gateway 30 checks whether the original command 204 received as part of the client data packet 220 corresponds to the command code 206 received. Verification may be done by performing a syntactic check of the command 204, or some kind of transformation of the original command 204 which should result in the command code 206 unless the original command 204 has been tampered.

In order to carry out step 142 according to the present example, in step 140 the gateway 30 regenerates a control command code 206' using the same code generation algorithm as used by the client device 10. In step 142 this control command code 206' is compared with the received first command code 206 to ensure that the command 204 has not been modified. Comparison is of course not required if the original command 204 has been modified in such a way that it is no longer possible to derive a control command code 206' therefrom. In such cases the request to transmit the command 204 is rejected without further verification.

When all the checks are successfully performed the original command 204 is transmitted in step 144 by the gateway 30 to the HUB 44 of the protected system 40 from where in step 146 it is routed to the second (protected) device 42 addressed by the command 204 to perform the function contained in the command 204.

Figure 4A:
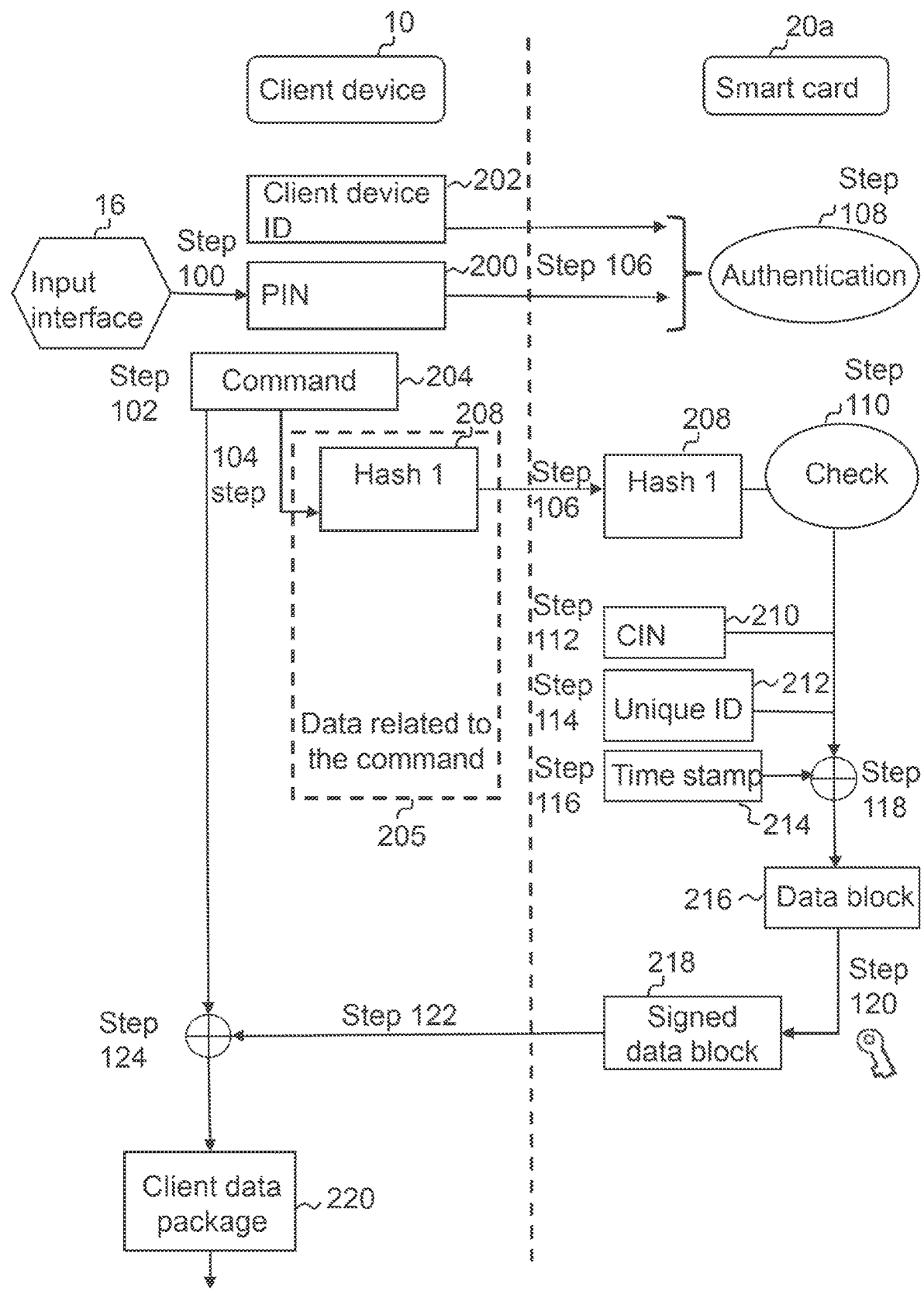
FIGS. 4a and 4b are flow diagrams illustrating the steps of another exemplary embodiment of the present invention.
Figure 4B:
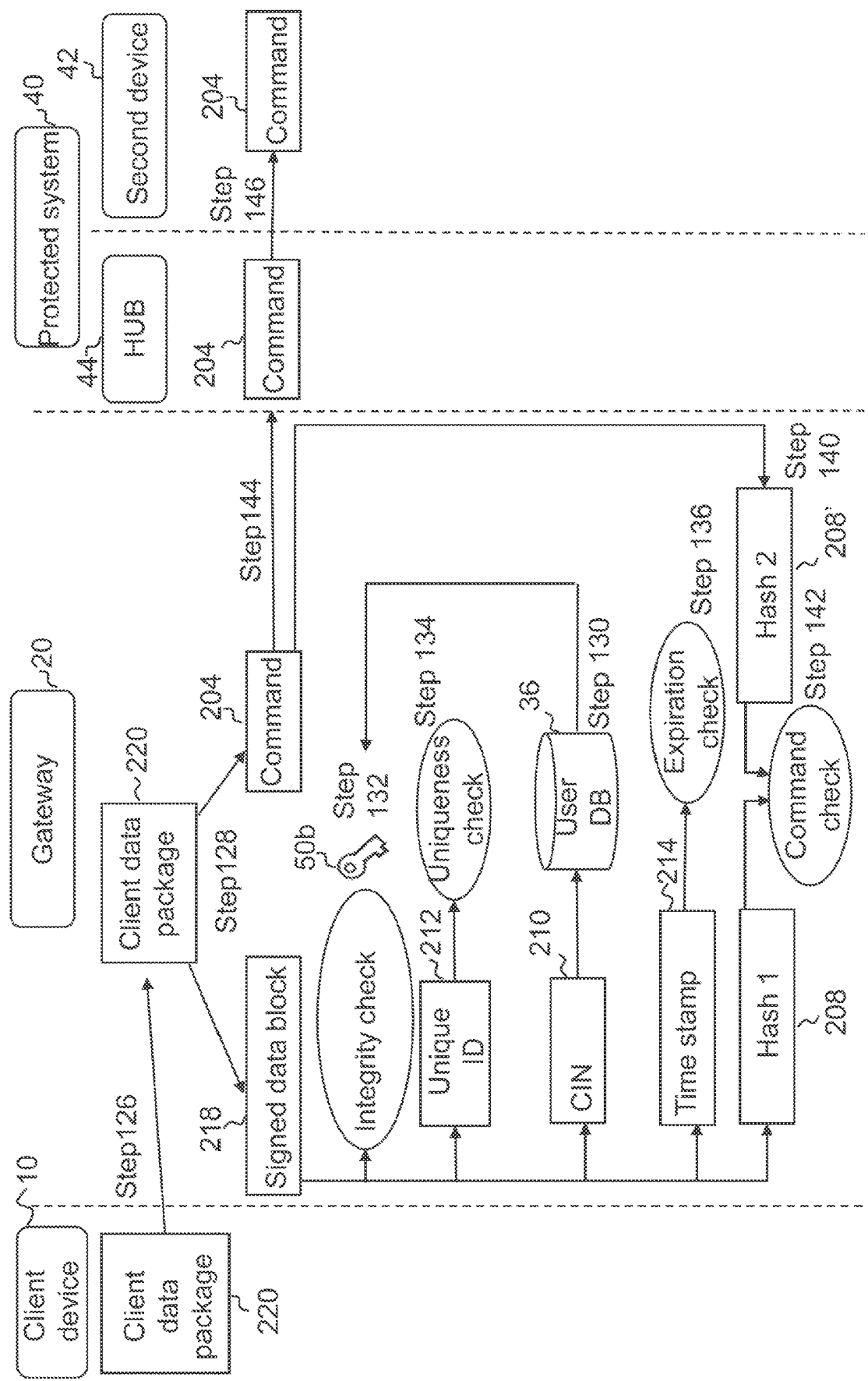

FIGS. 4a and 4b illustrate the steps of a second preferred embodiment. The same reference numerals have been used for corresponding steps and entities. It will be appreciated that the order of the steps may differ from the order presented here.

In the embodiment illustrated in FIGS. 4a and 4b the program 12a running on the client device 10 generates in step 104 a first hash 208 of the command 204 and uses this information as the data related to the command 205 executable by the second (protected) device 42.

The first hash 208 of the command 204 is generated by the program 12a using a hash algorithm (e.g. SHA-256). The first hash 208 is a compressed data obtained from the original command 204 which does not allow reconstruction of the original command 204. If the original command 204 is modified and the hash algorithm is applied to the modified command 204 this will result in a substantially different hash, whereby the first hash 208 can be used for tamper proofing as known in the art.

In step 106 the user authentication data (unique PIN 200 and client device identifier 202) and the data 205 (which is now the command hash 208) are transmitted to the smart card 20a that is connected to the user device 10 via the smart card interface 14 of the client device 10. The user identification data and the data 205 may be transmitted in separate steps as well.

Following user authentication as described in the first embodiment the smart card 20a verifies in step 110 the first hash 208 of the command 204 by checking the user privileges data 25 stored in the secure storage 22 in order to determine whether or not the authenticated user has the necessary credentials to use the command 204 which is defined by the command hash 208. If the authenticated user is allowed to transmit the command 204, which is defined by the command hash 208, to the protected system 40 then the control step is successful and the process continues, otherwise an error response or the like may be sent back to the client device 10.

In this embodiment all further steps performed by the smart card 20a and the mobile program 12a running on the client device 10 are the same as described above. Even the gateway 30 performs the same control steps up to step 136.

In order to make sure that the same command 204 has been sent in the client data packet 220 as what has been checked in step 110 by the smart card 20a, the gateway 30 generates a second hash 208' from the original command 204 in step 140 and compares it in step 142 with the first hash 208 received in the client data packet 220 to assure that the command 204 has not been manipulated and the user has the necessary credentials. After successful verification the original command 204 is transmitted in step 144 by the gateway 30 to the HUB 44 of the protected system 40 from where it is routed to the second device 42 addressed by the command 204 to perform the function contained in the command 204.

Figure 5A:
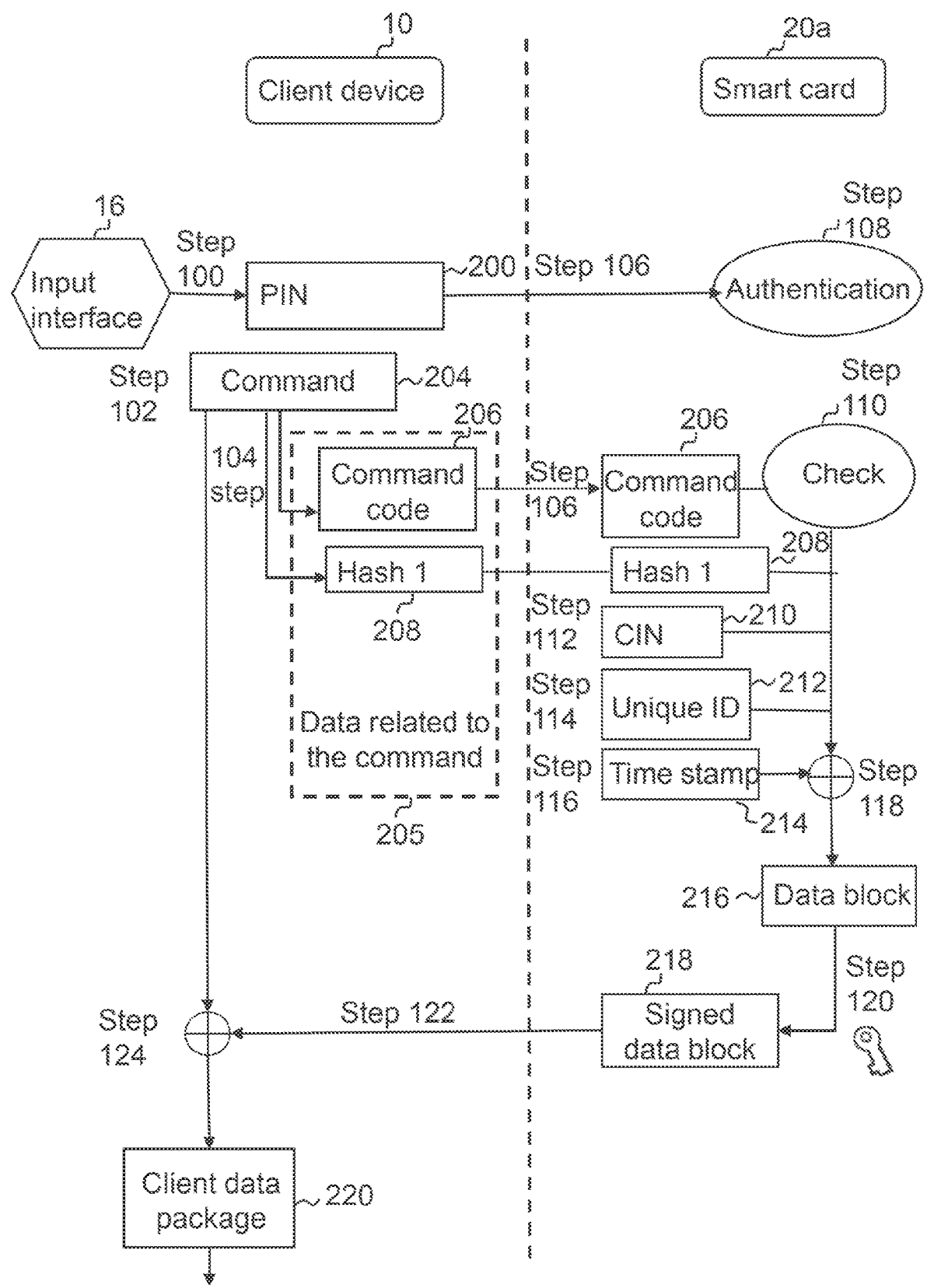
FIGS. 5a and 5b are flow diagrams illustrating the steps of another exemplary embodiment of the present invention.
Figure 5B:
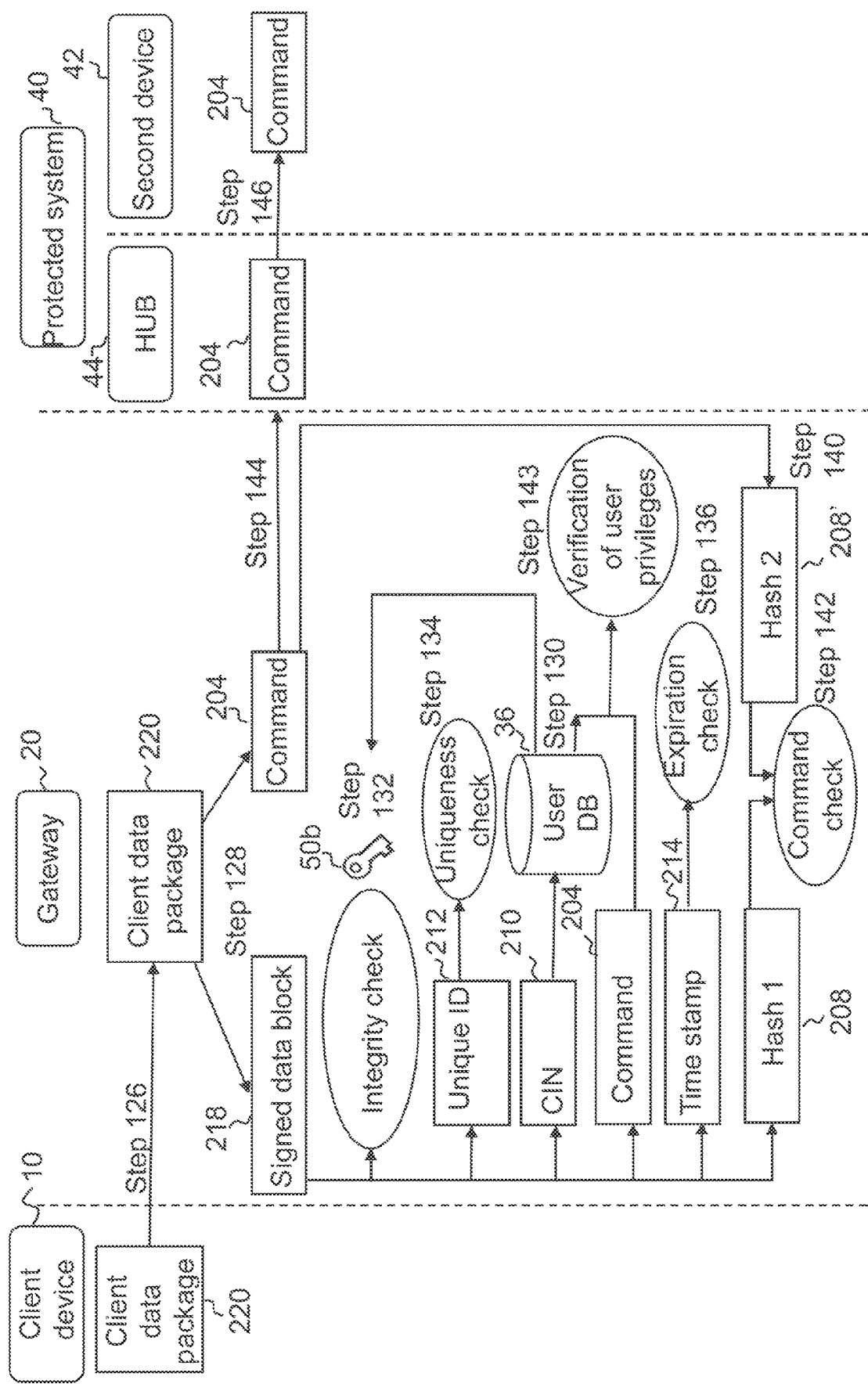

A further preferred embodiment illustrated in FIGS. 5a and 5b combines the above described two embodiments by generating in step 104 both the command code 206 and the first hash 208 of the command 204 by the program 12a running on the client device 10 and using them together as the data 205. Also here the same reference numerals have been used for corresponding steps and entities which have been introduced before. It will be appreciated that also in this case the order of the steps may differ from the order presented here.

According to the present embodiment, the user authentication data consists of the unique PIN 200 only, which is transmitted together with the data 205, consisting of the command code 206 and the command hash 208 in step 106 to the smart card 20a that is connected to the user device 10 via the smart card interface 14 of the client device 10. The smart card 20a performs all the steps as described in the first embodiments but also includes the first hash 208 of the command 204 in the data block 216 which is then signed. From this point on all the steps performed by the smart card 20a, the program 12a on the client device 10 and the gateway 30 are identical with what has been described in respect of the first embodiment until checking user privileges. In this embodiment we are checking the integrity of the original command in step 142, because a more detailed control will be carried out. In step 140 the gateway 30 generates a second hash 208' from the command 204 using the same hash algorithm as used by the client device 10. In step 142 correspondence of the command 204 with the first hash 208 is verified by comparing the second hash 208' with the received first hash 208 to ensure that the command 204 has not been modified. In case of successful match of the two hashes 208, 208' detailed verification of user privileges, step 143, follows based on the user privileges data stored in the user database 36. In this embodiment verification of user privileges at the gateway 30 side checks whether the user is entitled to issue the command 204 with the specific parameters the command 204 contains. It may happen that the list of parameters is so detailed that it cannot be explicitly included in a set of privileges —e.g. from which time until which time a door may be opened—so the authorization on the smart card 20a based on the command code 206 is limited to whether the user may open the door at all, but the time limits are checked by the gateway 30 based on the command 204 content. After successful verification the original command 204 is transmitted in step 144 by the gateway 30 to the HUB 44 of the protected system from where it is routed to the second device 42 addressed by the command 204 to perform the function contained in the command 204.

FIGS. 6a and 6b illustrate a further preferred embodiment of the system illustrated in FIGS. 1b and 2b. Here too the same reference numerals have been used for corresponding steps and entities which have been introduced before. It will be appreciated that also in this case the order of the steps may differ from the order presented.

In step 102, as described above, program 12a stored in the data storage 12 of client device 10 generates command 204 for the remotely controllable second (protected) device 42. In this embodiment the data 205 for the command 204 is the command 204 itself, so it is sent to the secure storage device 20 in step 106.

In this embodiment, the client ID consists of the client device ID 202 of the client device 10 and the user unique PIN code 200, which is transmitted together with the command 204 generated by the client application 12a stored in the database 12 of the client device in step 106 through the communication interface 13 of the client device 10 through the communication interface 83 and smart card interface 84 of the remote server 80 being in communication connection with client device 10 to the remote secure storage device 20, as illustrated in FIGS. 1b and 2b. In this embodiment, the smart card 20a can be substituted in any way with any remote secure storage device, such as a Hardware Security Module, a virtual card, or other device.

In the present embodiment, it is particularly advantageous to associate the identification of the user with two identifiers, one that the user knows (200 PIN code) and one that the user owns (202 client device identifier), and although the user is not directly in possession of the secure storage device 20, nevertheless two factor identification can be ensured.

The secure storage device 20 performs user identification in step 108, compares the user ID data received with the authentication data 24 stored in the secure storage part 22 of the secure storage device 20. If the user authentication is successful, the procedure continues, otherwise an error message or the like can be returned to the client device 10.

In step 110, the secure storage device 20 checks the command 204 by looking up the user credentials 25 stored in the secure storage part 22 to determine if the identified user has the appropriate privileges to apply the command 204. If the identified user is allowed to forward the command 204 to the protected device 42, the control step is successful and the procedure continues, otherwise an error message or the like can be returned to the client device 10.

Subsequently, each further step performed by the secure storage device 20 until step 120 is the same as that described with respect to the first embodiment, except that the data 205 is the original command 204 and not the command code 206. In step 122, the signed data block 218 is returned from the secure storage device 20 to the remote server 80 via the smart card interface 84 and then to the client device 10 using the communication interface 83.

In step 124, the client device 10 generates the client data packet 220 containing the signed data block 218. In this embodiment, it is not necessary to also place the command 204 in the client data packet 220.

In step 126 (FIG. 6b), the communication unit 13 of the client device 10 transmits the client data packet 220 to the gateway 30 via an electronic communication channel 60 using the Internet 62, which is preferably a VPN connection.

Then, the steps of the gateway 30 correspond to steps 130-136 of the first embodiment.

In step 142, the gateway 30 optionally checks the command 204, which may be, for example, a syntax check or a check regarding to which second (protected) device 42 the command 204 must be forwarded. After all checks have been successfully completed, at step 144, the gateway 30 transfers the command 204 to the HUB 44 of the protected system 40, which transmits it to the second (protected) device 42 to perform the operation defined in command 204.

If the gateway 30 is integrated with the second (protected) device 42 (as shown in FIG. 1c), then the gateway 30 performs the function of the HUB 44 of the protected system and transmits the command 204 directly to the second (protected) device 42.

In a further preferred embodiment, after step 110, the secure storage device 20 performs data transformation on the controlled data, be it either command code 206, command hash 208, or the command 204 itself, and places the newly generated data related to the command 205 into the data block 216. From this step on, further steps of the process can be continued according to any of the previous embodiments.

Any of the prior embodiments may also be accomplished by generating also the command 204 in the secure storage device 20, and then performing each task in the secure storage device 20 until step 122.

In step 122, the signed data block is returned from the secure storage device 20 through the smart card interface 14 to the client device 10, where the client device 10 generates the client data packet 220 containing at least the signed data block 218.

Similarly to prior embodiments, the communication module 13 of the client device 10 transmits the client data packet 220 to the gateway 30 via an electronic communication channel 60, which is preferably a VPN connection, using the Internet 62.

Subsequently, the non-illustrated steps of the gateway 30 can be executed as described in the previous embodiments.

After all checks have been successfully completed, according to the embodiments previously seen, the gateway 30 transmits command 204 to the HUB 44 of the protected system 40, from where it is forwarded to the second device 42 addressed by the command 204 to perform the operation defined in the command 204.

As can be seen the present invention has the advantage that the original command 204 did not need to be modified and the addressed system (protected system 40 and second device 42) does not recognize anything from the very high level of protection which has been integrated into the communication. This is achieved by performing a local check based on the stored user credentials in the secure storage device 20 of the user, on the data 205 related to the command 204, which data may also be the command 204 itself, and generating a digitally signed data block 218 in the secure storage device. The data block 218 may be individualized, which is achieved by adding one or more data elements to the data block 216 like user identification (210 CIN), transaction ID (unique ID 212), time stamp 214, or potentially even other data elements. If the signed data block 218 does not already contain it, then together with the original command 204, it is sent from the client device 10 to the gateway 30, where integrity, validity, and authenticity of the signed data block 218 is verified and when all checks are successful and the original command 204 corresponds to the data 205 and its values fall between predefined user specific parameters, then the original command 204 is forwarded to the protected device 42 the same way as if no additional security checks would have been performed by the user's secure storage device 20 and the gateway 30.

In the following two concrete examples are shown to illustrate the application of the present invention:

EXAMPLE 1: SMART HOME OPERATION

The home has a complex smart operating system which comprises light and temperature control, including the closing and opening of shades and shutters, watering the lawn with a sprinkler system, the manipulation of surveillance cameras, and even the opening and locking of the gate as well as the main entrance and windows. The management of all these devices can be performed through a communication HUB 44 even remotely using a dedicated application on a smart phone (client device 10).

The HUB 44 is capable of performing some basic level of user authentication and authenticated users can perform all possible functions without any further controls.

To make the operation more secure and sophisticated a secure system is added to the legacy home management system, comprising the secure gateway 30, the extension of the user's mobile management application with some additional functions and chip card management capability, and the introduction of smart cards 20a.

First the gateway 30 is configured which task comprises delegation of an Admin function to the key user the recording of all the possible functions in a database including possible parameters which may provide limits of certain operations (like max. temperature setting)

the registration of users together with their assigned card IDs delegation of functions to individual users, with parameter limits if relevant (like entry—opening the door—is only allowed between 9 am and 5 pm for the house keeper)

When the users are registered they are each assigned their individual, personalized smart cards 20a carrying the card ID (CIN 210), the service application of the system, their own private keys 50a, certificates and potentially even some other information.

When the individual roles have been defined, the associated credentials are stored on the users' smart cards 20a. This process may be performed locally with the gateway 30 itself but the credentials may even be distributed remotely over the air, using the mobile phone's NFC antenna. Remote credential distribution has the advantage that even ad hoc changes in the roles may be performed with simple logistics, without the personal presence of the user.

After setting up the secure system, users have specific, individually tailored rights, roles with the home management system. They all use the same mobile application (program 12a), but still will not be able to perform the same functions.

According to the present settings parents may open and close the front door all day long. This means that they select the door opening icon as the command 204 in the mobile program 12a, the program 12a generates the associated command code 206 and requests the smart card 20a to be touched to the NFC antenna of the mobile phone. When the user touches the smart card 20a to the NFC antenna of the mobile phone (client device 10) it will request the PIN 200 of the user. If the PIN 200 is provided correctly the smart card 20 will check based on the stored list of credentials whether this specific user has the necessary right to issue the command 204 represented with the command code 206. If the command code 206 is included in the list, the command 204 may be issued by the user, the smart card 20a individualizes the command code 206 with a timestamp 214, a unique ID 212, the CIN 210, signs the generated data block 216 and returns this information to the mobile application (program 12a). This whole control function should be performed in a very short time. The mobile application takes the signed data block 218 and the original command 204, establishes secure communication with the gateway 30 and sends this data packet 220 to the gateway 30. The gateway 30 checks the signature of the signed data block 218, generated by the smart card 20a, assuring that the message has not been tampered with, then continues with checking the timestamp 214 for validity and the unique ID 212 to make sure that it has not been used yet. Eventually the user's credential is checked in the gateway's 30 database 36. When the message passes all these controls the syntax of the original command 204 is validated to assure that it corresponds to the command code 206 which has been proofed by the smart card 20a. In case all the results are positive the original command 206 is forwarded to the HUB 44 of the smart home management system, which will forward it to the door, which then will be opened.

Should the children have issued the same door opening command, who are not allowed to open the door after 8 pm till 7 am, the control at the gateway 30 would have included a check of the privilege parameters to assure that all rules are properly observed. The door opening command 204 would be forwarded to the gateway HUB 44 only outside the restricted period.

On the other hand the gardener could not have issued the same command 204. Already the smart card 20a would have rejected it, if the gardener only has rights to open the gate, but not the front door.

By installing the secure gateway 30 between the HUB 44 and the legacy mobile application (program 12a) the whole home management system became much more secure, sophisticated, and no changes needed to be carried out on either the HUB 44 or any of the smart modules of the home.

EXAMPLE 2: CONNECTED CAR

A different application use case of the secure gateway 30 is the protection of connected cars. Having remote communication access to the car is a great new feature adding to convenience and user friendliness, may even save cost through predictive maintenance and lower insurance fees, but it carries also great risks. Unless there is very strong protection the remote connection may turn out to be a real threat for all the passengers of the vehicle. (It has been demonstrated that using the remote communication channel of a car full control including steering and breaking can be taken over from the driver while on the road.)

The secure gateway 30 may just provide the right protection, with blocking access for everyone without the necessary credentials, and allowing only specific tasks to be performed which are delegated to the individual users.

In this scenario the configuration of the gateway 30 would be performed by the manufacturer who would retain all admin rights. It would create a set of privileges for itself which could include monitoring of all key parts of the car. A different set of privileges—role—would be generated for the insurance company, who could monitor speed, acceleration and similar information related to the driver's driving habit. The repair stations would also receive a specific set of rights and associated credentials. And obviously the future drivers of the car would have their own privileges too.

When the cars are shipped none of the credentials are issued yet to the users, only the manufacturer would have its own rights. Upon selling a car the new owner receives a secure storage device 20 in the cloud which is associated with the new vehicle. All the driver associated credentials are available there and when the mobile car management application is used it communicates with this remote secure storage device 20 to issue the various commands 204 which may include the retrieval of performance parameters, turning on heating or cooling, looking up route history, etc. When the driver selects a repair station, the workshop will also receive a set of credentials associated with the specific car. The service has its credentials stored on a smart card 20a which is connected to the service's computer system, and can carry the data of all the cars serviced by the shop in a virtually separated area for each car on the same chip. The service station receives its credentials remotely over the air from the manufacturer. The same scenario is performed in respect of the insurance company of the driver though the insurer will get a different set of credentials.

From this point on the generation of commands 204 by the mobile application of the driver, or the PC based applications of the other actors, as well as the controls performed by the gateway 30 are the same as they are described above in the first example.

There may however be a couple of slight differences. One may be that the car's secure gateway 30 may automatically establish communication with the actors having the right to communicate with it, without waiting for them to start the communication. This capability assures that all information would always be available in respect of the vehicle. The other difference is the strength of message protection which may require that the original command 204 is also signed in the secure storage device 20 to assure that not only the general content of the command 204 corresponds to the command code 206 but none of its parameters have been modified either. (An equivalent solution is when both command code 206 and command hash 208 derived from the command 204 are included in the signed data block 218.)

Various modifications to the above disclosed embodiments will be apparent to a person skilled in the art without departing from the scope of protection determined by the attached claims.

The invention claimed is:

1. A method for client-side credential control to allow remote access to a second device, the method comprising:
providing a gateway at least one of integrated into the second device or provided independent thereof, the gateway configured to communicate with a first device over an electronic communication channel, wherein the first device comprises a client device and the second device comprises a protected device;
providing a secure storage device for the first device;
storing first user authentication data in the secure storage device;
providing user privileges relating to at least a first command executable by the second device and storing user credentials in the secure storage device, wherein the user credentials further comprise privileges data and indicate that a user associated with the user privileges is authorized to cause the at least the first command to be executed by the second device, and wherein the user credentials are different from the first user authentication data;
providing a key pair of asymmetric cryptography having a private key and a public key;
storing the private key of the key pair used for the asymmetric encryption in the secure storage device;
receiving, by the secure storage device from the first device, second user authentication data;
comparing, by the secure storage device, the second user authentication data to the first user authentication data to determine that the user is an authenticated user of the secure storage device;
generating at least a first data related to the at least a first command executable by the second device;
determining, by the secure storage device, that the first data related to the first command executable by the second device corresponds to at least one user credential stored in the secure storage device, and thus concluding that the at least one user credential indicates that the user associated with the at least one user credential is authorized to cause the at least the first command to be executed by the second device;
in response to determining that the user is an authenticated user of the secure storage device and concluding that the at least one user credential indicates that the user associated with the at least one user credential is authorized to cause the at least the first command to be executed by the second device, generating in the secure storage device a data block that represents the at least the first command executable by the second device;

signing the data block with the secure storage device using the private key stored in the secure storage device;

generating at least one data packet from the data block signed with the private key; and transmitting the at least one data packet to the gateway via the electronic communication channel.

2. The method according to claim 1, further comprising:

checking with the gateway the at least one data packet by verifying the integrity of the signed data block using the public key; and in response to verifying the integrity of the data block, authorizing the second device to execute the at least the first command corresponding to the user privilege.

3. The method according to claim 1, wherein the data block comprises a command executable by the second device.

4. The method according to claim 1, wherein the data block comprises at least one of a command code or a command hash, and the at least the first command executable by the second device is also forwarded to the gateway in at least one of the data packet containing the signed data block or in a separate data packet associated therewith.

5. The method according to claim 4, wherein checking the data packet, in addition to verifying the integrity of the signed data packet, also includes verifying the correspondence of the first command executable by the second device with the data related to the first command contained in the data block.

6. The method according to claim 2, wherein checking the data packet, in addition to verifying the integrity of the signed data block, further comprises:

checking, by the gateway, parameters contained in the first command executable by the second device and corresponding to the user privilege parameters; and authorizing execution of the first command for the second system in response to the parameters in the first command corresponding to limits established for the user.

7. The method according to claim 2, wherein during the checking of the at least one data packet, the second device to which the first command is directed is determined by the gateway.

8. The method of claim 2, wherein checking the data packet, in addition to verifying the integrity of the signed data block, also includes examining other content identifier elements of the data block.

9. The method according to claim 2, wherein the user is determined based on the signature of the data block during the checking of the at least one data packet.

10. The method according to claim 2, wherein during the checking of the at least one data packet, the user is determined on the basis of a unique identifier provided in the data block.

11. The method according to claim 1, wherein the secure storage device provided for the first device is at least one of an embedded secure element in the first device, a removable card of the first device, an external smart card connectable to the first device, a software application of the first device, or a secure storage device on a remote server.

12. The method according to claim 1, wherein the private key stored in the secure storage device provided for the first device is assigned to the individual user.

13. The method according to claim 1, wherein the private key stored in the secure storage device provided for the first device is the private key of the gateway used by all users.

14. The method according to claim 1, wherein the at least one first data related to the at least the first command executable by the second device is generated in the client device.

15. The method according to claim 1, wherein the at least one first data related to the at least the first command executable by the second device is generated in the secure storage device provided for the client device.

16. A secure storage device of a first device, the secure storage device comprising:

a storage unit;

a communication interface; and a processor device coupled to the storage unit and the communication interface, wherein the secure storage device is configured to:

store a private key of a key pair used for asymmetric encryption in the secure storage device;

store first user authentication data in the secure storage device;

receive, from the first device, second user authentication data;

compare the second user authentication data to the first user authentication data to determine that the user is an authenticated user of the secure storage device;

at least one of receive or generate at least one first data related to a first command executable by a second device;

determine that the data related to the first command executable by the second device corresponds to at least one user credential stored in the secure storage device, and thus conclude that the at least one user credential indicates that a user associated with the at least one user credential is authorized to cause the first command to be executed by the second device, wherein the at least one user credential is different from the first user authentication data;

in response to determining that the user is an authenticated user of the secure storage device and concluding that the at least one user credential indicates that the user associated with the at least one user credential is authorized to cause the first command to be executed by the second device, generate in the secure storage device a data block that represents the first command executable by the second device;

sign the data block with the secure storage device using the private key stored in the secure storage device;

at least one of receive or generate at least one second data related to a second command executable by a second device; and determine that the data related to the second command executable by the second device does not correspond to any user credential stored in the secure storage device that indicate the user is authorized to cause the second command to be executed by the second device, and thus conclude that the user is not authorized to cause the second command to be executed by the second device.

17. The secure storage device according to claim 16, wherein the first authentication data and the second authentication data each comprise at least one of user PIN information or user biometric information.

18. The secure storage device according to claim 16, wherein the secure storage device is further configured to:

in response to determining that the user is an authenticated user of the secure storage device and concluding that the user is not authorized to cause the at least the second command to be executed by the second device, refraining from generating in the secure storage device a data block that represents the at least the second command executable by the second device.

19. The method according to claim 1, wherein the first authentication data and the second authentication data each comprise at least one of user PIN information or user biometric information.

20. The method according to claim 1, further comprising:
generating at least a second data related to at least a second command executable by the second device, and
determining, by the secure storage device, that the second data related to the second command executable by the second device does not correspond to any user credential stored in the secure storage device that indicate the user is authorized to cause the second command to be executed by the second device, and thus concluding that the user is not authorized to cause the at least the second command to be executed by the second device.

21. The method according to claim 20, further comprising:
in response to determining that the user is an authenticated user of the secure storage device and concluding that the user is not authorized to cause the at least the second command to be executed by the second device, refraining from generating in the secure storage device a data block that represents the at least the second command executable by the second device.

* * * * *